(12) United States Patent
Marcel

(10) Patent No.: US 9,233,725 B2
(45) Date of Patent: Jan. 12, 2016

(54) BICYCLE SEAT FOR REDUCING PRESSURE ON A PUBIC BONE OF A USER

(71) Applicant: Vincent Robert Marcel, El Segundo, CA (US)

(72) Inventor: Vincent Robert Marcel, El Segundo, CA (US)

(73) Assignee: Vincent Marcel, El Segundo, CA (US)

( * ) Notice: Subject to any disclaimer, the term of this patent is extended or adjusted under 35 U.S.C. 154(b) by 31 days.

(21) Appl. No.: 14/216,763

(22) Filed: Mar. 17, 2014

(65) Prior Publication Data

US 2014/0265467 A1 Sep. 18, 2014

Related U.S. Application Data

(60) Provisional application No. 61/852,591, filed on Mar. 18, 2013.

(51) Int. Cl.
*B62J 1/00* (2006.01)

(52) U.S. Cl.
CPC . *B62J 1/002* (2013.01); *B62J 1/007* (2013.01)

(58) Field of Classification Search
CPC .............. B62J 1/002; B62J 1/007; B62J 1/02
See application file for complete search history.

(56) References Cited

U.S. PATENT DOCUMENTS

| 6,254,180 | B1 * | 7/2001 | Nelson | 297/201 |
| 7,322,644 | B2 * | 1/2008 | Bigolin | 297/201 |
| 7,537,281 | B2 * | 5/2009 | Riondato | 297/202 |
| 2003/0071498 | A1 * | 4/2003 | Yu | 297/215.16 |
| 2011/0018315 | A1 * | 1/2011 | DeRoy | 297/202 |
| 2014/0145479 | A1 * | 5/2014 | Li | 297/195.1 |

* cited by examiner

*Primary Examiner* — Philip Gabler
(74) *Attorney, Agent, or Firm* — Plager Schack LLP

(57) ABSTRACT

An ergonomic bicycle seat to reduce pressure on a pubic bone, ischial tuberosity and pudendal surface of a user includes a concave frame with an opening in a central portion of the frame. The concave frame cradles the ischial tuberosity of the user and the opening removes pressure on the pubic bone and pudendal surface of the user. A support layer is affixed to a top portion of the concave frame and an arched rail is affixed to a bottom portion of the concave frame and a bicycle. The rail flexes and disperses a weight load of the user away from the pubic bone of the user.

4 Claims, 3 Drawing Sheets

BICYCLE SEAT FOR REDUCING PRESSURE ON A PUBIC BONE OF A USER

RELATED APPLICATION

The application claims priority to provisional patent application U.S. Ser. No. 61/852,591 filed on Mar. 18, 2013, the entire contents of which is herein incorporated by reference.

BACKGROUND

The embodiments herein relate generally to bicycle seats or saddles. More specifically, embodiments of the invention relate to bicycle seats for reducing pressure on the pubic bone, ischial tuberosity and pudendal surface of the rider.

Traditional bicycle seats contain a shell enclosed by a cover. However, the shell and cover form a solid piece, which places excessive pressure on the rider's pubic bone, ischial tuberosity and pudendal surface. This is especially problematic for all riders including men and women of all ages. Men may suffer from erectile dysfunction and/or prostatitis after experiencing pressure on the pudendal surface for extended periods of time. Women may experience yeast infections and/or endometriosis from excessive pressure on the pudendal surface for extended periods of time. In addition, both men and women may experience a numbness or tingling in their genital regions or sciatica due to excessive pressure from the bicycle seat.

As such, there is a need in the industry for a bicycle seat that effectively reduces the pressure on the pubic bone, ischial tuberosity and pudendal surface of the user.

SUMMARY

An ergonomic bicycle seat configured to reduce pressure on a pubic bone, ischial tuberosity and pudendal surface of a user to minimize the incidence of an injury is provided. The bicycle seat comprises a substantially concave frame comprising an opening in a central portion of the frame, wherein the concave frame is configured to cradle the ischial tuberosity of the user and the opening is configured to remove pressure on the pubic bone and pudendal surface of the user, a support layer affixed to a top portion of the concave frame, and an arched rail affixed to a bottom portion of the concave frame and a bicycle, wherein the rail is configured to flex and disperse a weight load of the user away from the pubic bone of the user.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
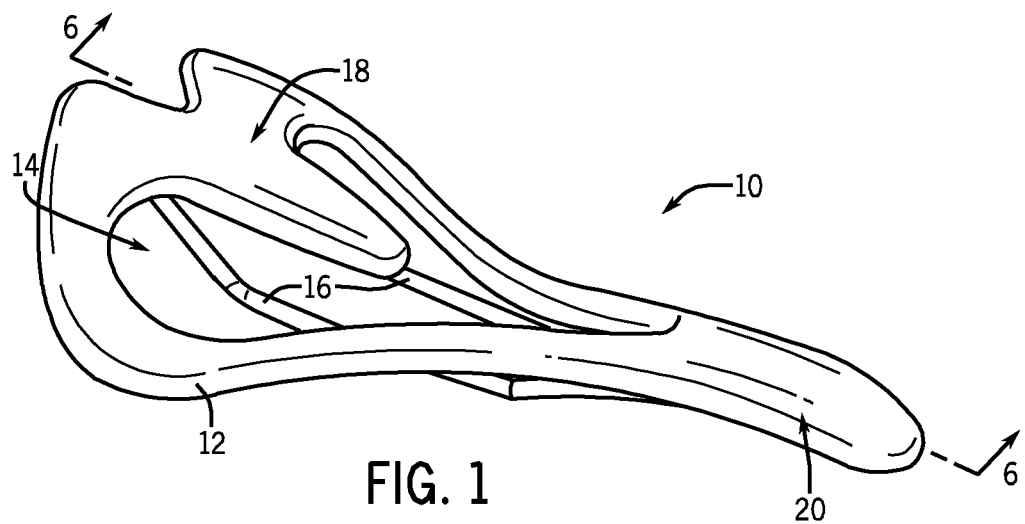
FIG. 1 depicts a top perspective view of certain embodiments of the bicycle seat.
Figure 2:
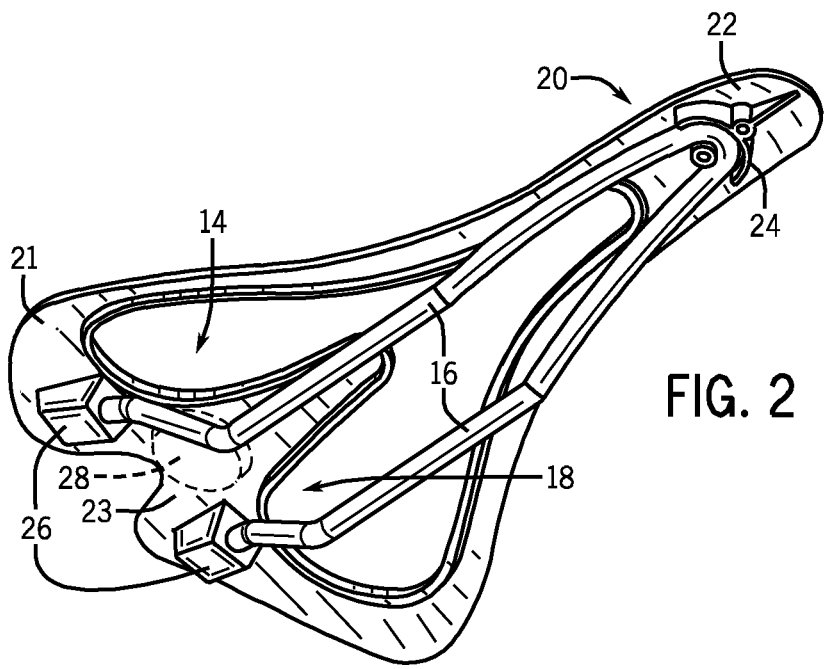
FIG. 2 depicts a bottom perspective view of certain embodiments of the bicycle seat.

As depicted in FIGS. 1-2, bicycle seat 10 comprises cover 12, seat frame 21 and mounting rail 16. Cover 12 is a support layer, which comprises front support area 20 and rear support area 18. Cover 12 is secured to seat frame 21 and maintains opening 14 of seat frame 21. Cover 12 may comprise any material or combination of materials including, but not limited to, closed cell foam, nylon, carbon fiber, or the like. Opening 14 in cover 12 and seat frame 21 comprises a heart shape, which is configured to be situated below the user's pubic bone and genital region. This allows the user's pubic bone and genital region to rest within opening 14, which removes any pressure from bicycle seat 10 directed towards these portions of the user's body.

Figure 3:
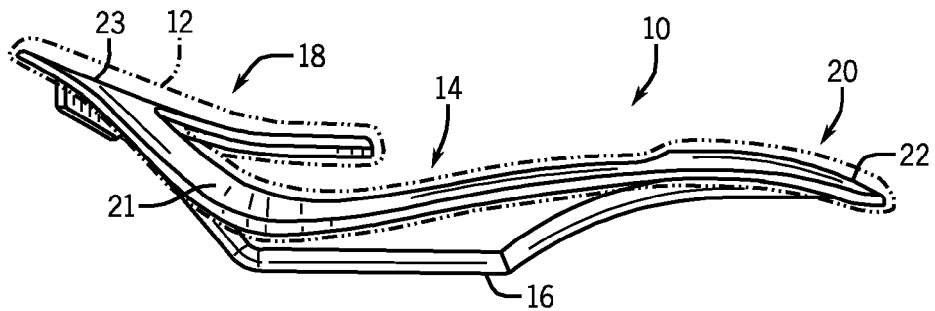
FIG. 3 depicts a side elevation view of certain embodiments of the bicycle seat with the cover being shown in phantom.

Seat frame 21 comprises front frame portion 22 and rear frame portion 23. As depicted in FIG. 3, seat frame 21 comprises a substantially concave shape that leads to opening 14. The concave shape of seat frame 21 is configured to cradle and support the convex portion of the user such as the ischial tuberosity. Seat frame 21 may be made from any materials including, but not limited to, nylon glass, carbon fiber, carbon, or the like. In a preferred embodiment, seat frame 21 may have various sizes such as small (up to 9-11 centimeters), medium (11-13 centimeters), and large (13-17 centimeters). These sizes allow bicycle seat 10 to accommodate adults and children of all ages. Cover 12 is affixed to seat frame 21 by any fastening means known in the field such as an adhesive.

Figure 4:
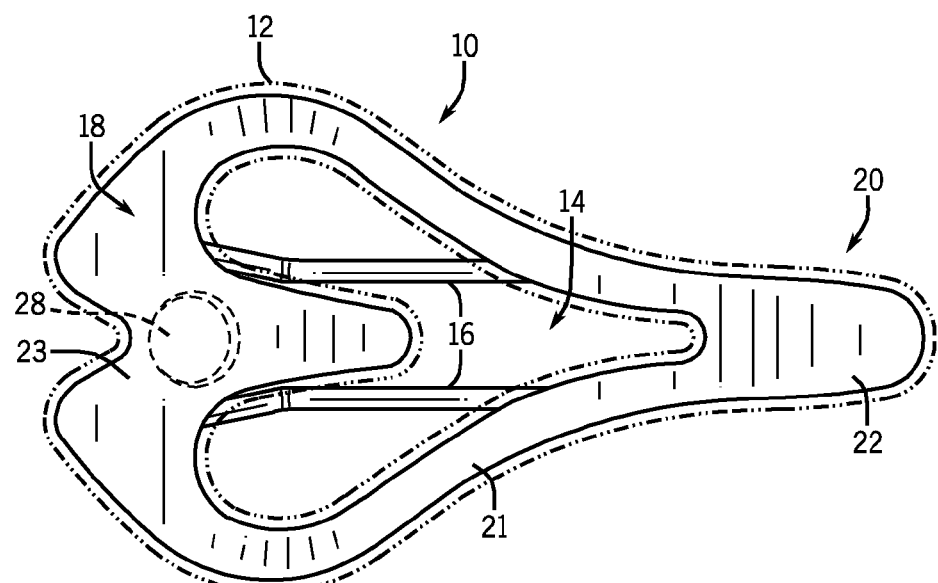
FIG. 4 depicts a top plan view of certain embodiments of the bicycle seat with the cover being shown in phantom.

Mounting rail 16 is affixed to seat frame 21 at front mount 24 and rear mounts 26. In a preferred embodiment, high strength aircraft screws (not shown) secure rail 16 to seat frame 21 at front mount 24. Mounting rail 16 is molded within cover 12 and seat frame 21 at rear mounts 26. It shall be appreciated that any alternative fastening components known in the field may be used to secure mounting rail 16 to bicycle seat 10 and the bicycle. Mounting rail 16 is ¼" thick and may be made from any materials including, but not limited to, carbon steel, titanium, carbon, or the like. The front portion of mounting rail 16 comprises an arch, which increases the strength of the rail and effectively disperses the weight load of the user throughout bicycle seat 10. Mounting rail 16 is further configured to flex, which allows bicycle seat 10 to move with the user. This further reduces pressure and friction on the user. As depicted in FIG. 4, two portions of mounting rail 16 extend substantially parallel to one another below opening 14 of seat frame 21.

In an alternative embodiment, bicycle seat 10 comprises magnet 28, which is affixed to the bottom of seat frame 21. Magnet 28 may be used in conjunction with a tool bag (not shown) comprising a corresponding magnet that engages with magnet 28. This allows the user to conveniently store any tools or belongings in the bag under seat frame 21 of bicycle 10.

Figure 5:
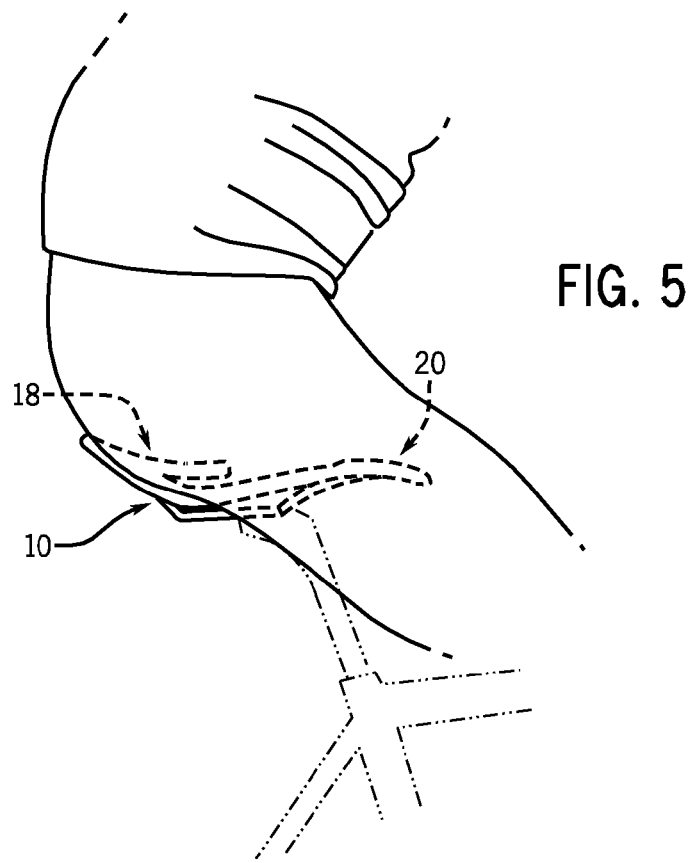
FIG. 5 depicts a side elevation view of certain embodiments of the bicycle seat in use.
Figure 6:
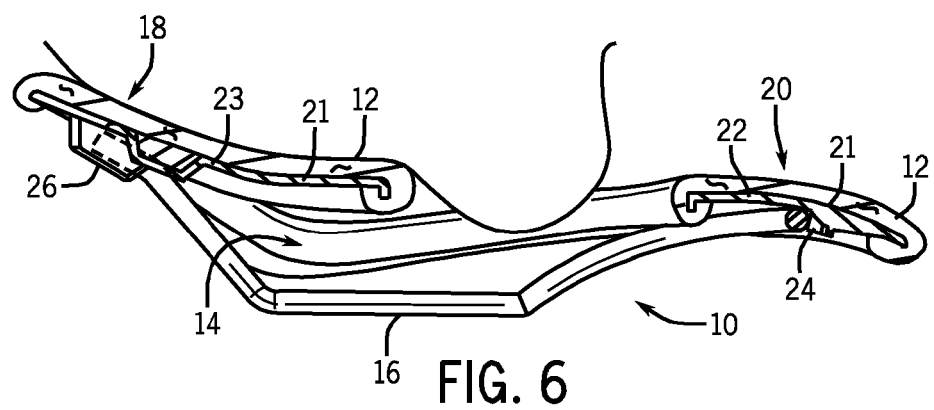
FIG. 6 depicts a cross-sectional view of certain embodiments of the bicycle seat taken along line 6-6 of FIG. 1.

As depicted in FIGS. 5-6, in operation, bicycle seat 10 is affixed to a bicycle. The user sits on bicycle seat 10 and operates the bicycle as normal. The user's pubic bone and genital region rests within opening 14 of bicycle seat 10. This removes any pressure from bicycle seat 10 that may be directed toward the user's pubic bone and genital region. Further, pressure is also reduced from the user's ischial tuberosity and pudendal surface, thereby reducing the likelihood that the user may suffer an injury, disorder or complication of an existing ailment. The narrow front support area 20 of bicycle seat 10 reduces chaffing of the user's inner thighs. The concave shape of seat frame 21 cradles and supports the convex portion of the user such as the ischial tuberosity and buttocks.

It shall be appreciated that the components of bicycle seat 10 described in several embodiments herein may comprise any alternative known materials in the field and be of any color, size and/or dimensions. This allows the bicycle seat to accommodate any user and variety of bicycles. It shall be appreciated that the components of the bicycle seat described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An ergonomic bicycle seat configured to reduce pressure on a pubic bone, ischial tuberosity and pudendal surface of a user to minimize the incidence of an injury, the bicycle seat comprising:
   a substantially concave frame comprising a generally heart-shaped opening in a central portion of the frame sufficiently large to receive the pubic bone and a genital region of the user, the heart-shaped opening comprising a front edge, side edges and a rear edge that extend along outer edges of the concave frame, wherein the rear edge of the heart-shaped opening is elevated above side edges of the opening, wherein the concave frame is configured to cradle the ischial tuberosity of the user and the opening is configured to remove pressure on the pubic bone and pudendal surface of the user;
   a support layer affixed to a top portion of the concave frame; and
   an arched rail affixed to a bottom portion of the concave frame and a bicycle, wherein the rail is configured to flex and disperse a weight load of the user away from the pubic bone of the user.

2. The ergonomic bicycle seat of claim 1, wherein the frame opening comprises a heart shape.

3. The ergonomic bicycle seat of claim 2, wherein the arched rail comprises a curvature such that two portions of the rail extend substantially parallel to one another below the opening of the concave frame.

4. The ergonomic bicycle seat of claim 2, further comprising a magnet affixed to a bottom portion of the concave frame.

* * * * *